11/19/85 OR 4,553,819

United States Patent [19]
Correll

[11] Patent Number: 4,553,819
[45] Date of Patent: Nov. 19, 1985

[54] VISUAL AID APPARATUS FOR VIEWING OBJECTS BENEATH WATER SURFACE

[76] Inventor: Charles Correll, 161 Haigler Rd., Lenoir, N.C. 28645

[21] Appl. No.: 625,442

[22] Filed: Jun. 27, 1984

[51] Int. Cl.⁴ ............................................... G02B 5/00
[52] U.S. Cl. .................................. 350/319; 441/135; 350/276 R
[58] Field of Search ........................ 350/319, 276 R; 441/135; 114/66

[56] References Cited

U.S. PATENT DOCUMENTS

| | | | |
|---|---|---|---|
| 2,712,139 | 7/1955 | Kelly | 350/319 |
| 2,746,194 | 5/1956 | Lonnman | 350/319 |
| 3,081,726 | 3/1963 | Betts et al. | 350/319 |
| 3,628,853 | 12/1971 | Stoscup | 350/319 |
| 4,145,783 | 3/1979 | Rhodes | 441/135 |

FOREIGN PATENT DOCUMENTS 1397456  6/1975  United Kingdom ............... 441/135

Primary Examiner—Jon W. Henry
Attorney, Agent, or Firm—W. Thad Adams, III

[57] ABSTRACT

A visual aid apparatus (10) is disclosed. The apparatus (10) permits clear vision through the surface of the water. Apparatus (10) includes a relatively thin transparent sheet (11) which is preferably circular. A buoyant, closed-wall member (12) is secured in a leakproof manner to sheet (11) to define a relatively shallow, pan-like container for floating on the surface of the water. Apparatus (10) also includes a relatively short length of tube pivotally mounted to the outer periphery of the container for holding a vacuum or suction pipe of the kind used to clean a swimming pool.

4 Claims, 6 Drawing Figures

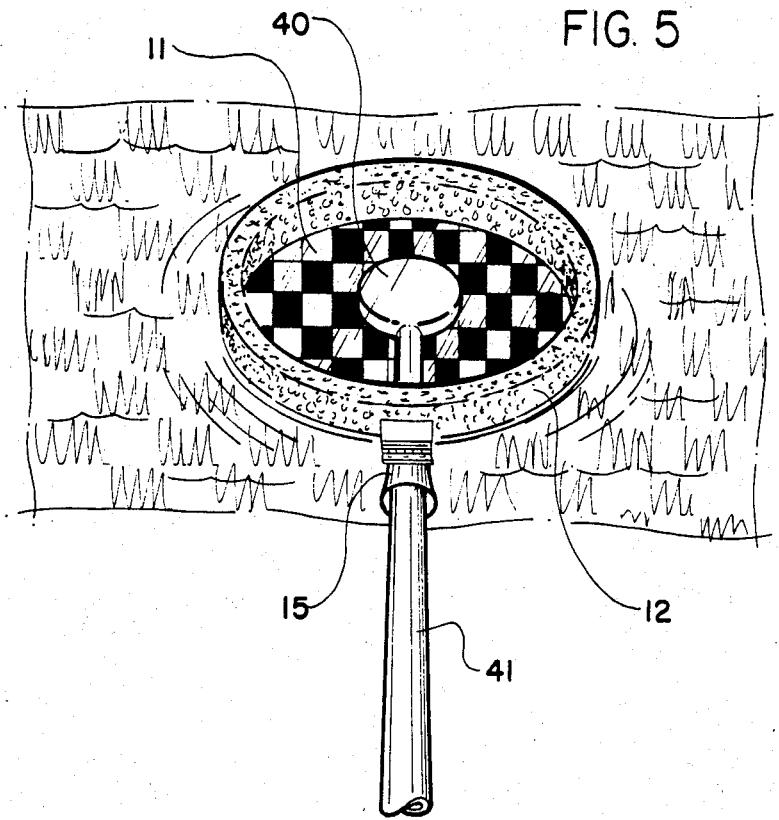
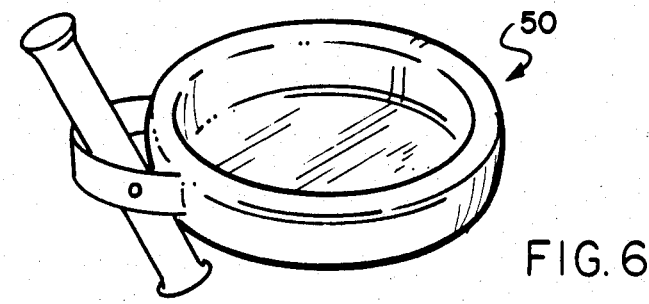

VISUAL AID APPARATUS FOR VIEWING OBJECTS BENEATH WATER SURFACE

TECHNICAL FIELD AND BACKGROUND OF THE INVENTION

This invention relates to a visual aid apparatus which is particularly useful for viewing objects or structures beneath the surface of water. The particular embodiment disclosed in this application is of an apparatus for use with a swimming pool vacuum cleaner to permit the user to clearly see the bottom of the pool so that the bottom of the pool can be quickly and efficiently cleaned by permitting the user to see where the vacuum nozzle should be directed.

As is well known, flat water forms a relatively transparent surface and, depending on the turbidity of the water, will permit clear vision to a substantial depth. However, disturbance on the water surface caused by wind or objects in the water cause light reflections and undesirable light refraction which makes it virtually impossible to see beneath the surface of the water.

In principle, it is known that subsurface vision can be greatly improved by creating a perfectly flat surface on the water. For example, a glass-bottom boat accomplishes this by creating a viewing window beneath the surface of the water. Likewise, one wearing a scuba mask can greatly improve underwater vision by placing the clear lens of the mask beneath the surface of the water.

However, to the best of applicant's knowledge, this principle has never been applied to assist in carrying out utilitarian functions in swimming pool maintenance or spearfishing in shallow water. Therefore, this invention is directed to a visual aid apparatus which is particularly suited for these purposes.

SUMMARY OF THE INVENTION

Therefore, it is one object of the invention to provide a visual aid apparatus for forming a flat plane on a water surface to permit clear vision of subsurface objects.

It is another object of the present invention to provide a visual aid apparatus which permits a user cleaning the bottom of a swimming pool with a vacuum device to efficiently direct the vacuum nozzle along the bottom of a swimming pool, avoiding repeated passes over the same areas and making sure that other areas are not missed.

It is another object of the present invention to provide a visual aid apparatus which permits spear and gig fishing in shallow water, notwithstanding surface disturbance which impairs underwater vision.

These and other objects and advantages of the invention are achieved in the preferred embodiment disclosed below by providing a relatively thin transparent sheet of material having a pre-determined size and shape and a buoyant, closed wall member secured in a leakproof manner to said transparent sheet to define a relatively shallow, pan-like container for floating on the surface of the water. The walls prevent water from entering the container and the transparent sheet permits viewing of subsurface objects by providing a perfectly flat plane on the surface of the water.

Means are carried by the container for holding an elongate member, such as a vacuum hose pipe, of the kind used to clean a swimming pool.

According to one of the embodiments disclosed in this application, the holding means comprises a tube pivotally mounted to the outer periphery of the container for holding a vacuum or suction pipe.

According to another embodiment disclosed in this application, a ring having raised walls secured to the transparent sheet of material within the container defined by the buoyant wall and the transparent sheet of material defining a void within the ring for receiving a vacuum or suction pipe.

According to yet another embodiment of the invention disclosed herein, the holding means comprises a hook for receiving an elongate member, such as a spear or gig.

Preferably, the transparent sheet material comprises clear plastic and the buoyant wall comprises an expanded, closed-celled thermoplastic foam.

BRIEF DESCRIPTION OF THE DRAWINGS

Other objects and advantages of the invention will appear when described below in connection with the following drawings, in which:

FIG. 5 is a perspective view of a section of a swimming pool surface, wherein a checkerboard pattern along the bottom of the swimming pool is more clearly visible in the area on which the visual aid apparatus according to this invention is positioned; and FIG. 6 is a perspective view of an embodiment of the invention which is constructed of clear plastic and is injection molded.

DESCRIPTION OF THE PREFERRED EMBODIMENT

Figure 1:
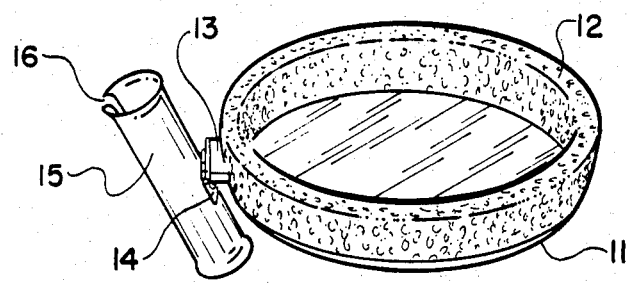
FIG. 1 is a perspective view of one embodiment of the present invention.

Referring now specifically to the drawings, a visual aid apparatus according to one embodiment of the present invention is shown in FIG. 1 and broadly designated at reference numeral 10. Visual aid apparatus 10 comprises a circular sheet of clear plastic material 11 to which is secured a closed wall member 12. Closed wall member 12 is secured to sheet 11 around its outer periphery with any suitable waterproof adhesive and is sealed by a silicone caulk or the like to prevent leakage. Wall member 12 is preferably constructed of a very buoyant material, such as expanded, closed-celled thermoplastic foam so that the visual aid apparatus 10 easily floats on the surface of the water.

Secured to one side edge of transparent sheet 11 is a bracket 13 to which is secured a hinge 14. A length of plastic tubing 15 is secured to the hinge so that the tube easily pivots through a substantial arc. Tubing 15 is preferably a relatively flexible material and is provided with a split 16 down one side to permit insertion and withdrawal of a hose or pipe of the type used with a swimming pool vacuum.

Figure 2:
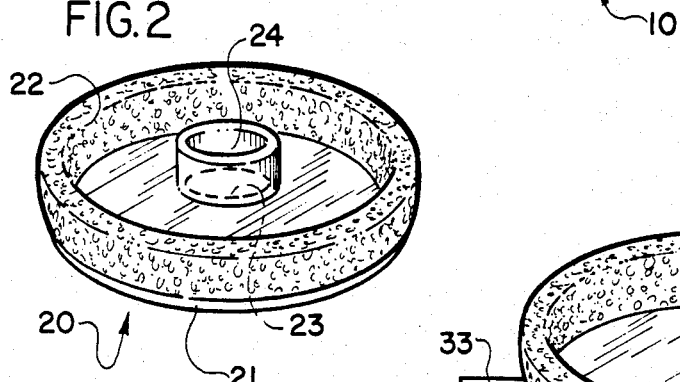
FIG. 2 is a perspective view of another embodiment of the present invention.

Referring now to FIG. 2, another embodiment of the invention is shown and broadly designated at reference numeral 20. Visual aid apparatus 20 is comprised of a circular sheet of thin transparent material 21 to which is secured a closed wall member 22. As with visual aid apparatus 10, wall member 22 is secured with adhesive to transparent sheet 21 and sealed with a waterproof caulking material to prevent leakage of water into the container defined by the transparent sheet 21 and wall member 22. In visual aid apparatus 20, a centrally positioned void 23 is formed in transparent sheet 21 and is surrounded by a foam ring 24. The ring 24 and void 23 define a passageway for a vacuum or suction pipe so that as the suction nozzle is moved along the bottom of the pool, visual aid apparatus 20 automatically moves with it.

Figure 3:
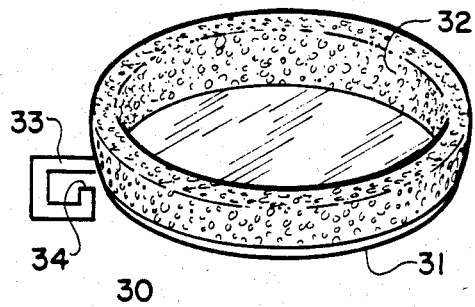
FIG. 3 is a perspective view of yet another embodiment of the present invention.

A visual aid apparatus is shown in FIG. 3 and designated generally at reference numeral 30. Visual aid apparatus 30 comprises a thin transparent sheet 31 to which is secured a buoyant, closed wall member 32 which defines a relatively shallow, pan-like container for floating on the water surface. Waterproof caulking is applied to the juncture of transparent sheet 31 and wall member 32 to form a waterproof container.

A hook 33 is secured by any suitable means to transparent sheet 31. Hook 33 comprises an enclosure having an opening 34 therein defined by a free end 34. Using hook 33, any solid structure can be easily placed in the hook and used to move visual aid apparatus 30 along the water but easily and quickly removed when desired.

Note that in FIGS. 1, 2 and 3 walls 12, 22 and 32, respectively, are slightly curved inwardly towards the bottom to provide a boat-like bottom which will more easily ride on the water.

Figure 4:
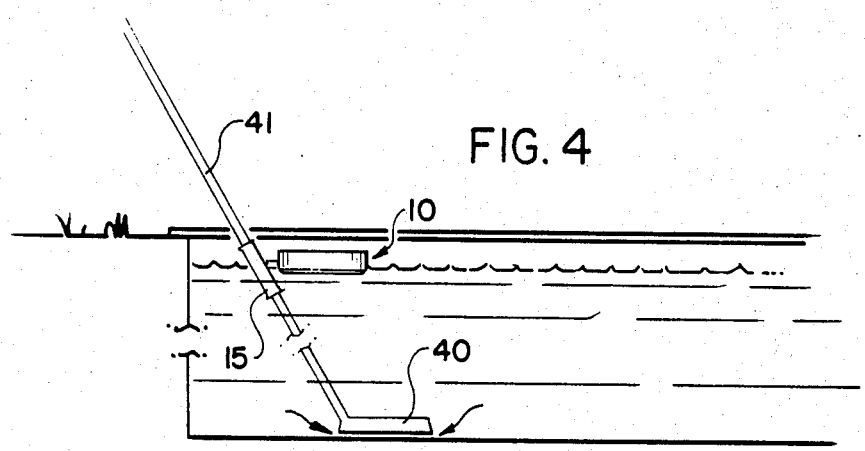
FIG. 4 is a side elevational view of the embodiment of the invention shown in FIG. 1 in use on a swimming pool to permit efficient cleaning of the bottom of the swimming pool.

Referring now to FIG. 4, visual aid apparatus 10 is shown in use. As a vacuum nozzle 40 is moved along the bottom of a swimming pool, the vacuum cleaner pipe 41 moves visual aid apparatus 10 along the surface of the water because it is positioned in tube 15.

Referring now to FIG. 5, the improvement in vision obtained by using visual aid apparatus 10, 20 or 30 is illustrated. Cleaning the bottom of the swimming pool is much more efficient since the user can easily see and distinguish between areas which have already been cleaned and areas which have not yet been cleaned.

FIG. 6 shows an embodiment which is injection molded of a clear plastic material in a single piece to form a visual aid apparatus 50. Tubing 51 is pivotally mounted on a bracket 52 by means of an inwardly protruding dimples 53 on both sides of bracket 52 and mating recesses in opposite sides of tubing 51. Of course, other means could be used equally well.

Of course, visual aid apparatus 10, 20 or 30 can be made in any desirable size, depending on its intended use. Likewise, the height of wall member 11, 21 or 31 can be increased or decreased as is desired to take into account the likely degree of disturbance on the surface of the water. Many varieties of waterproof adhesives can be used to secure wall members 12, 22 and 32 to transparent sheets 11, 21 and 31, respectively.

Furthermore, visual aid apparatus 10, 20 and 30 can be used for many other purposes, such as to easily locate and retrieve objects which may fall into a swimming pool.

Three embodiments of a visual aid apparatus according to the present invention have been described above. In each case, the embodiment is provided for illustrative purposes only and not for purposes of limitation—the invention being defined by the claims.

I claim:
1. A visual aid apparatus for forming a flat plane on a water surface to permit clear vision of subsurface objects and comprising:
  (a) a relatively thin transparent sheet of material;
  (b) a buoyant, closed wall member secured in a leak-proof manner to said sheet to define a relatively shallow pan-like container for floating on the water surface, said wall preventing water from entering said container, and said transparent sheet permitting viewing of subsurface objects; and,
  (c) holding means carried by said container for holding an elongate member by which the container is maneuvered along the surface of the water as desired, said holding means comprising a tube pivotally mounted to the outer periphery of said container for holding a vacuum or suction pipe of the kind used to clean a swimming pool.

2. A visual aid apparatus according to claim 1, wherein said transparent sheet material comprises clear plastic.

3. A visual aid apparatus according to claim 1, wherein said buoyant wall comprises an expanded, closed-cell thermoplastic foam.

4. A visual aid apparatus according to claim 1, wherein the periphery of said container is substantially circular.

* * * * *